US011385199B2

(12) United States Patent
Watanabe et al.

(10) Patent No.: US 11,385,199 B2
(45) Date of Patent: *Jul. 12, 2022

(54) SENSOR ELEMENT

(71) Applicant: NGK INSULATORS, LTD., Aichi (JP)

(72) Inventors: Yusuke Watanabe, Nagoya (JP); Mika Kai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 166 days.

This patent is subject to a terminal disclaimer.

(21) Appl. No.: 16/551,767

(22) Filed: Aug. 27, 2019

(65) Prior Publication Data

US 2020/0072784 A1 Mar. 5, 2020

(30) Foreign Application Priority Data

Aug. 30, 2018 (JP) .............................. JP2018-161871

(51) Int. Cl.
*G01N 27/409* (2006.01)
*G01N 27/407* (2006.01)

(52) U.S. Cl.
CPC ....... *G01N 27/409* (2013.01); *G01N 27/4071* (2013.01); *G01N 27/4072* (2013.01)

(58) Field of Classification Search
CPC ........... G01N 27/4071; G01N 27/4077; G01N 27/4073; G01N 27/419; G01N 27/409;

(Continued)

(56) References Cited

U.S. PATENT DOCUMENTS 4,824,549 A * 4/1989 Hamada ............. G01N 27/4072
204/410
6,355,152 B1 * 3/2002 Kato ................... G01N 27/4072
204/425

(Continued)

FOREIGN PATENT DOCUMENTS

DE 102011078569 A1 * 1/2013 ......... G01N 27/4071
JP 2000-28576 A 1/2000

(Continued)

OTHER PUBLICATIONS

Renz et al. (DE 102011078569 A1, Machine Translation) (Year: 2011).*

(Continued)

*Primary Examiner* — Joshua L Allen
(74) *Attorney, Agent, or Firm* — Mattingly & Malur, PC

(57) ABSTRACT

A sensor element includes: an element base including: a ceramic body made of an oxygen-ion conductive solid electrolyte, and having a gas inlet at one end portion thereof; at least one internal chamber located inside the ceramic body, and communicating with the gas inlet under predetermined diffusion resistance; an electrochemical pump cell including an electrode located on an outer surface of the ceramic body, an electrode facing the internal chamber, and a solid electrolyte located therebetween; and a heater buried in the ceramic body, and a leading-end protective layer being porous, and covering a leading end surface and four side surfaces in a predetermined range of the element base on the one end portion. The leading-end protective layer has an extension extending into a widened portion included in the gas inlet, and fixed to an inner wall surface of the widened portion.

14 Claims, 10 Drawing Sheets

(58) Field of Classification Search
CPC ....... G01N 27/4072; G01N 27/406–41; G01N 33/0004–0075; F02D 41/1494
See application file for complete search history.

(56) References Cited

U.S. PATENT DOCUMENTS

| | | | |
|---|---|---|---|
| 2004/0188251 A1* | 9/2004 | Kurachi | G01N 27/419 204/426 |
| 2007/0084724 A1 | 4/2007 | Mori et al. | |
| 2008/0105545 A1* | 5/2008 | Nakagaki | G01N 27/419 204/424 |
| 2009/0242404 A1* | 10/2009 | Miyashita | G01N 27/4071 204/431 |
| 2011/0186431 A1* | 8/2011 | Horisaka | G01N 27/4077 204/424 |
| 2011/0226618 A1* | 9/2011 | Fujita | G01N 27/4072 204/412 |
| 2011/0233060 A1* | 9/2011 | Horisaka | G01N 27/4072 204/412 |
| 2012/0211362 A1* | 8/2012 | On | G01N 27/4077 204/424 |
| 2013/0220808 A1* | 8/2013 | Fujita | G01N 27/419 204/412 |
| 2014/0291150 A1* | 10/2014 | Otsuka | G01N 27/4077 204/424 |
| 2016/0161445 A1* | 6/2016 | Sakakibara | G01N 27/419 204/424 |
| 2020/0072785 A1 | 3/2020 | Watanabe et al. | |

FOREIGN PATENT DOCUMENTS

| | | |
|---|---|---|
| JP | 2007-139749 A | 6/2007 |
| JP | 4583187 B2 | 11/2010 |
| JP | 2013-064605 A | 4/2013 |
| JP | 5533767 B2 | 6/2014 |
| JP | 2017-187482 A | 10/2017 |

OTHER PUBLICATIONS

Unexamined U.S. Appl. No. 16/551,765, filed Aug. 27, 2019.
Japanese Office Action received in corresponding Japanese Application No. 2018-161871 dated Apr. 5, 2022.

* cited by examiner

F I G. 8
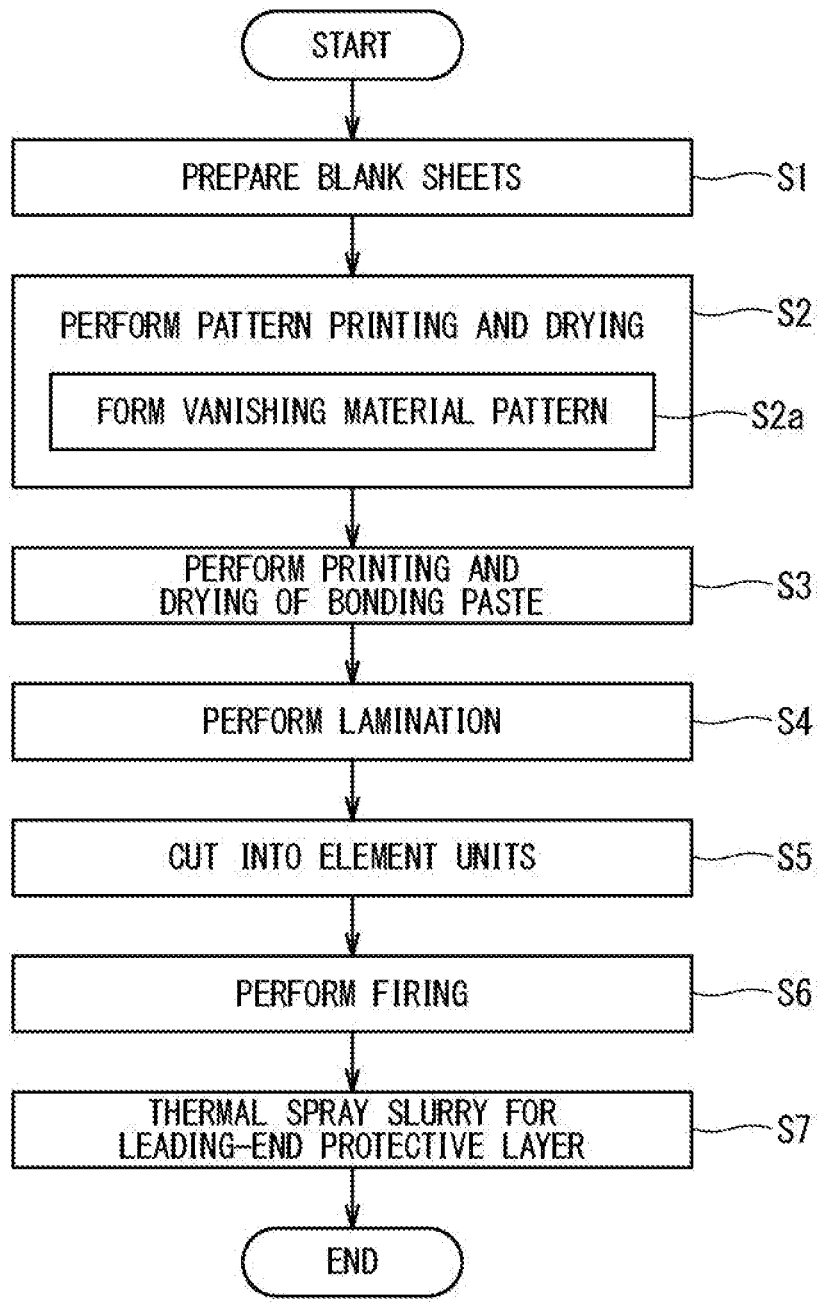

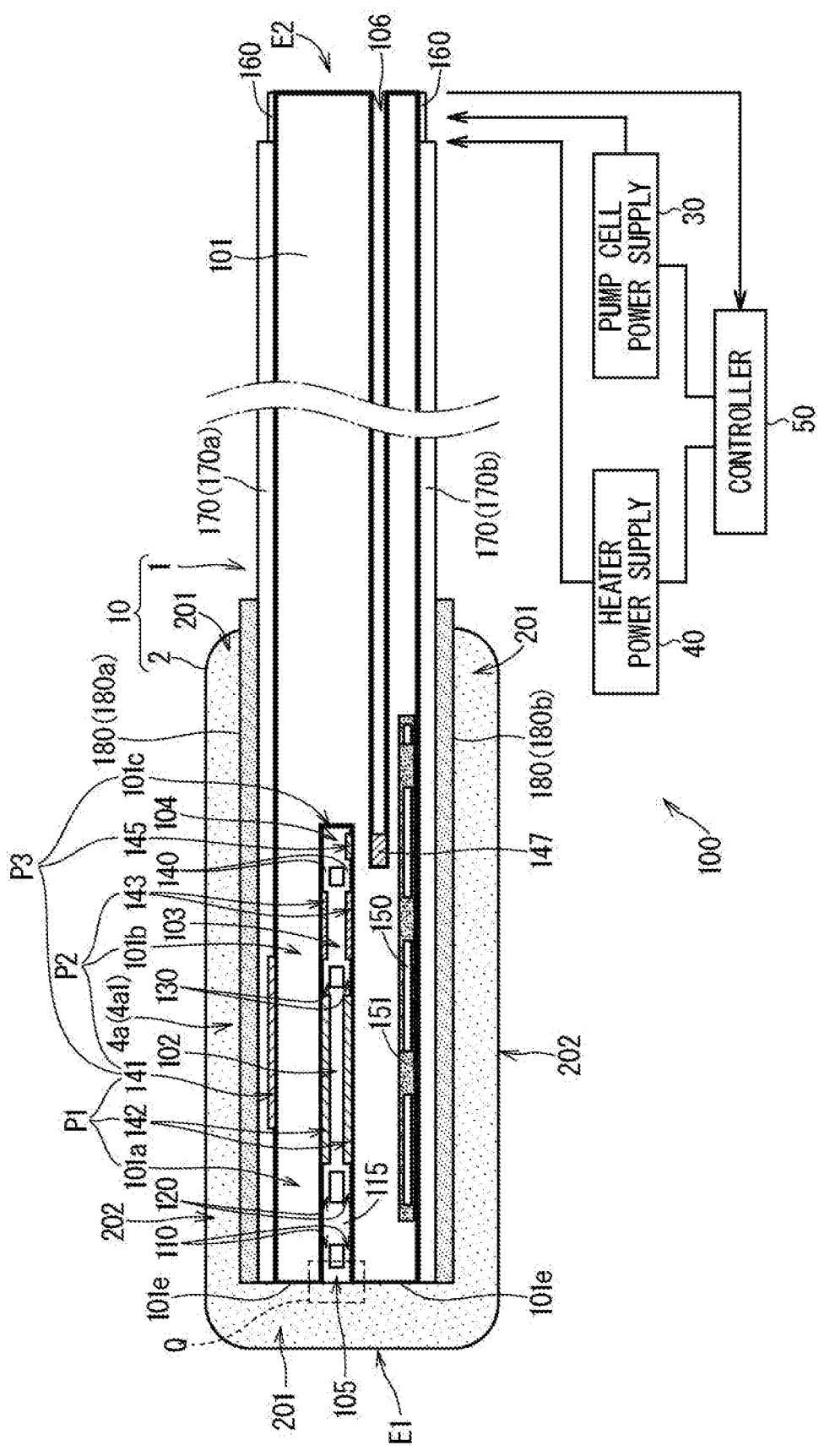

SENSOR ELEMENT

CROSS-REFERENCE TO RELATED APPLICATION

The present application claims priority from Japanese application JP 2018-161871, filed on Aug. 30, 2018, the contents of which is hereby incorporated by reference into this application.

BACKGROUND OF THE INVENTION

Field of the Invention

The present invention relates to a gas sensor detecting a predetermined gas component in a measurement gas, and, in particular, to a configuration of a leading end portion of a sensor element included in the gas sensor.

Description of the Background Art

As a gas sensor for determining concentration of a desired gas component in a measurement gas, a gas sensor that includes a sensor element made of an oxygen-ion conductive solid electrolyte, such as zirconia ($ZrO_2$), and including some electrodes on the surface and the inside thereof has been widely known. As the sensor element, a sensor element including a protective layer formed of a porous body (porous protective layer) at an end portion at which a gas inlet for introducing the measurement gas is provided has been known (see Japanese Patent Application Laid-Open No. 2013-64605, Japanese Patent No. 5533767, and Japanese Patent No. 4583187, for example).

The above-mentioned gas sensor is mainly installed onto an exhaust pipe of an internal combustion engine, such as a vehicle engine, and is used to detect a predetermined gas component contained in an exhaust gas from the internal combustion engine and further to measure the concentration of the gas component. When the gas sensor is used for such an application, the sensor element is frequently subjected to thermal shock due to repeated heating up in use of the internal combustion engine and cooling down not in use of the internal combustion engine. To achieve long-term stable operation of the gas sensor, it is required to provide the porous protective layer so that delamination and, further, detachment thereof do not occur upon receipt of thermal shock caused repeatedly.

Such delamination and, further, detachment occurring during long-term use of the gas sensor is not preferable because an introduction path of the measurement gas increases to more than expected at product designing, diffusion resistance of the measurement gas decreases, and, as a result, an output from the sensor element increases to more than a predetermined value.

As for this point, Japanese Patent Application Laid-Open No. 2013-64605 discloses a configuration in which a side surface of a sensor element is covered with an inorganic fiber sheet, and a protective layer is provided over the sheet to prevent delamination of the protective layer occurring due to thermal shock and the like.

Japanese Patent No. 5533767 discloses a configuration, of a gas sensor element including a porous protective layer provided at a portion exposed to a measurement gas, in which an upper end surface of the porous protective layer and the surface of the sensor element form a contact angle of 80° or less, and the upper end surface of the porous protective layer is smoothly curved to have an upwardly convex substantially circular arc-like or substantially parabolic shape in a planar direction of the sensor element to make delamination of the porous protective layer less likely to occur when the gas sensor element is subjected to shock or vibration.

Japanese Patent No. 4583187 discloses a configuration in which two or more porous ceramic layers are provided outside a ceramic heater element including a sensor portion on the surface or the inside thereof, and an inclined portion meeting a predetermined shape condition is provided at an end portion of an outermost ceramic layer to prevent delamination of the porous ceramic layers from the ceramic heater element due to a slight difference in coefficient of thermal expansion between the ceramic heater element and the porous layers.

However, none of Japanese Patent Application Laid-Open No. 2013-64605, Japanese Patent No. 5533767, and Japanese Patent No. 4583187 discloses or suggests a configuration, of a sensor element having a gas inlet in a leading end surface thereof, to positively secure adhesion of a porous protective layer to the leading end surface.

SUMMARY

The present invention relates to a gas sensor detecting a predetermined gas component in a measurement gas, and is, in particular, directed to a configuration of a leading end portion of a sensor element included in the gas sensor.

According to the present invention, a sensor element included in a gas sensor detecting a predetermined gas component in a measurement gas includes: an element base including: an elongated planar ceramic body made of an oxygen-ion conductive solid electrolyte, and having a gas inlet at one end portion thereof; at least one internal chamber located inside the ceramic body, and communicating with the gas inlet under predetermined diffusion resistance; at least one electrochemical pump cell including an outer pump electrode located on an outer surface of the ceramic body, an inner pump electrode located to face the at least one internal chamber, and a solid electrolyte located between the outer pump electrode and the inner pump electrode, the at least one electrochemical pump cell pumping in and out oxygen between the at least one internal chamber and an outside; and a heater buried in a predetermined range on a side of the one end portion of the ceramic body, and a leading-end protective layer being porous, and covering a leading end surface and four side surfaces in a predetermined range of the element base on the one end portion, wherein the gas inlet includes a widened portion on a leading end side of the ceramic body, and the leading-end protective layer has an extension extending into the widened portion, and fixed to an inner wall surface of the widened portion.

Accordingly, the sensor element in which delamination and, further, detachment of the porous leading-end protective layer on a side of the leading end surface of the element caused by application of thermal shock is suitably suppressed and adhesion of the leading-end protective layer to the element base is suitably secured, and which has great resistance to poisoning can thereby be achieved.

Preferably, the sensor element according to the present invention further includes a buffer layer being porous, having a larger porosity than the leading-end protective layer, and located outside the four side surfaces of the element base, wherein the leading-end protective layer is located further outside the buffer layer.

In this case, a so-called anchoring effect thereby acts between the leading-end protective layer and the buffer layer, and delamination of the leading-end protective layer from the element base caused by a difference in coefficient of thermal expansion between the leading-end protective layer and the element base is thus more suitably suppressed when the sensor element is in use.

It is thus an object of the present invention to provide a sensor element for a gas sensor in which adhesion of a porous leading-end protective layer to an element base on a side of a leading end surface is suitably secured.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flowchart of processing at the manufacture of the sensor element 10;

FIG. 10 is a schematic block diagram of the gas sensor 100 in a case where the sensor element 10 includes a buffer layer 180.

DESCRIPTION OF THE PREFERRED EMBODIMENTS

<Overview of Sensor Element and Gas Sensor>

Figure 1:
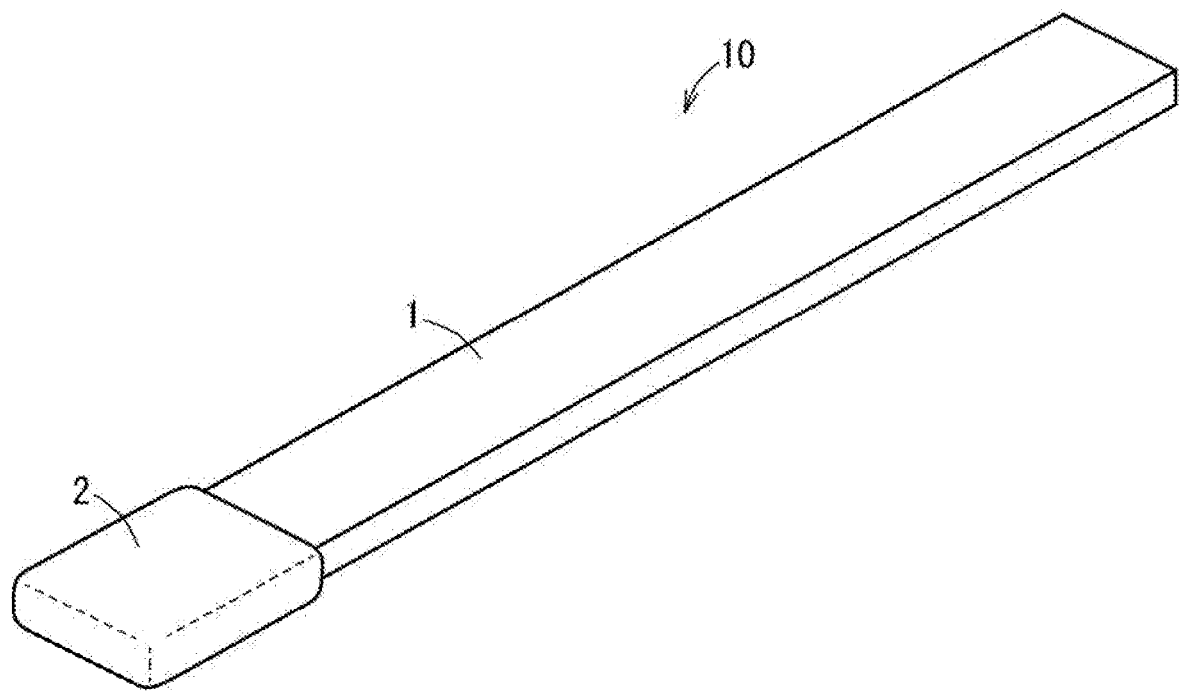
FIG. 1 is a schematic external perspective view of a sensor element (gas sensor element) 10.
Figure 2:
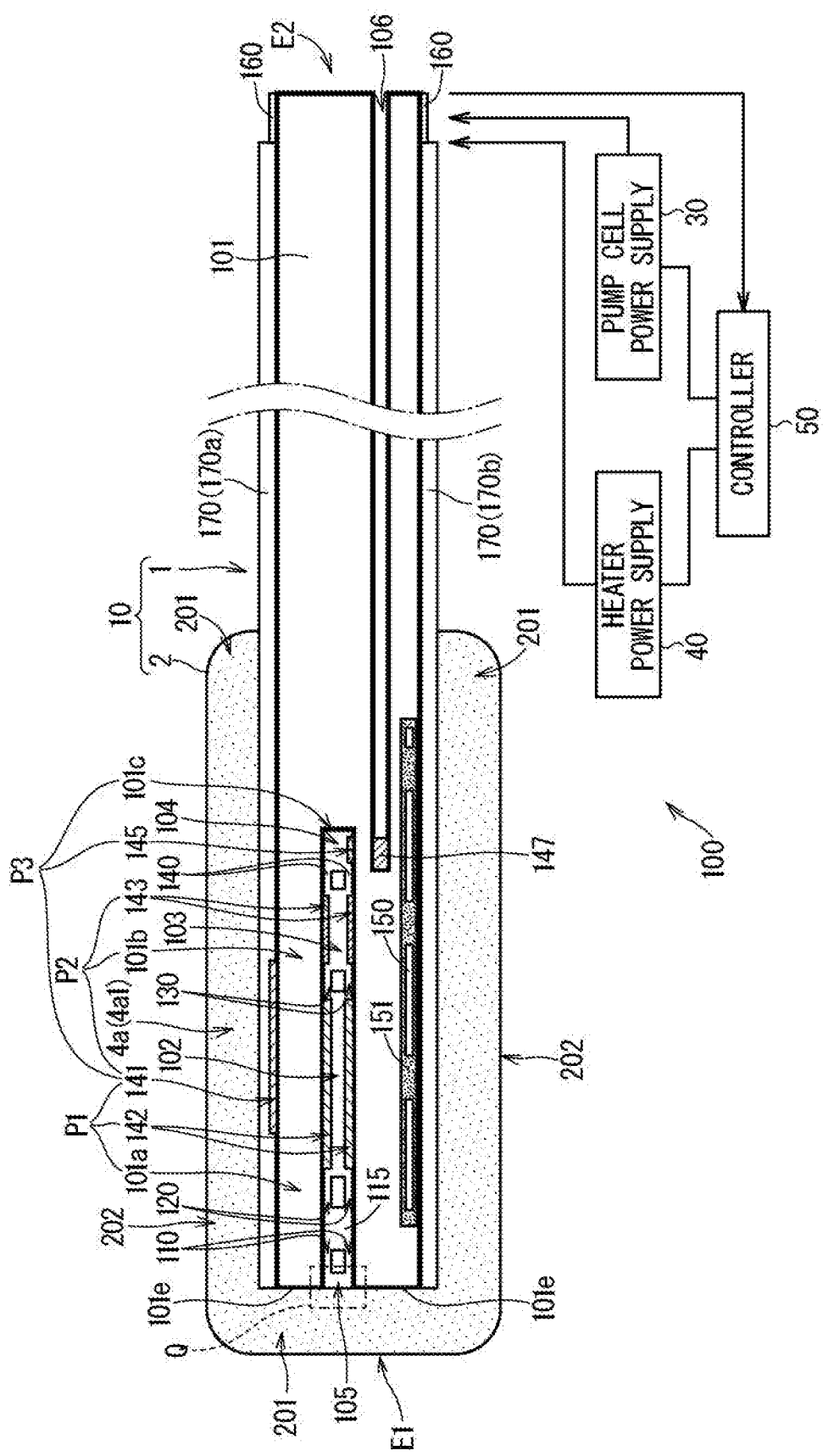
FIG. 2 is a schematic diagram illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic diagram illustrating a configuration of a gas sensor 100 including a sectional view taken along a longitudinal direction of the sensor element 10. The sensor element 10 is a main component of the gas sensor 100 detecting a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101e of the ceramic body 101) and four side surfaces, on one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101a that is a portion of the ceramic body 101 existing between these electrodes. In the second internal chamber 103, oxygen in the measurement gas is pumped out of the element by a pumping action of an auxiliary pump cell P2 that is also an electrochemical pump cell, so that the measurement gas is in a sufficiently low oxygen partial pressure state. The auxiliary pump cell P2 includes the outer pump electrode 141, the auxiliary pump electrode 143, and a ceramic layer 101b that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell to be in the low oxygen partial pressure state is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in the atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101c that is a portion of the ceramic body 101 existing between these electrodes. The measurement pump cell P3 is an electrochemical pump cell pumping out oxygen generated by decomposition of NOx in the atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying voltage necessary for pumping across electrodes included in each of the pump cells. In a case of the measurement pump cell P3, voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, detecting the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 to at least a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 becomes 500° C. or more. In some cases, the sensor element 10 is heated so that the temperature of the gas distribution part as a whole from the gas inlet 105 to the third internal chamber 104 becomes 500° C. or more. These are to enhance the oxygen-ion conductivity of the solid electrolyte forming each pump cell and to desirably demonstrate the ability of each pump cell. In this case, the temperature in the vicinity of the first internal chamber 102, which becomes the highest temperature, becomes approximately 700° C. to 800° C.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are provided on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170a, 170b) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170a on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer and Gas Inlet>

In the sensor element 10, the leading-end protective layer 2 that is a porous layer made of alumina having a purity of 99.0% or more is provided around an outermost periphery in a predetermined range from the one end portion E1 of the element base 1 having a configuration as described above.

In the following description, a portion of the leading-end protective layer 2 being in contact with the leading end surface 101e of the ceramic body 101 is referred to as an end surface portion 201, and a portion of the leading-end protective layer 2 being in contact with the four side surfaces including the two main surfaces (the pump surface and the heater surface) on which the main surface protective layers 170 are provided is referred to as a side surface portion 202.

The leading-end protective layer 2 is provided to surround a portion of the element base 1 in which the temperature becomes high when the gas sensor 100 is in use to thereby obtain water resistance in the portion. The leading-end protective layer 2 suppresses the occurrence of cracking (water-induced cracking) of the element base 1 due to thermal shock caused by local temperature reduction upon direct exposure of the portion to water.

Since the leading-end protective layer 2 is a porous layer, gas flows in and out between the gas inlet 105 and the outside at all times regardless of the presence of the leading-end protective layer 2. That is to say, introduction of the measurement gas into the element base 1 (ceramic body 101) through the gas inlet 105 is performed without any problems.

The leading-end protective layer 2 is preferably formed to have a thickness of 150 μm or more and 600 μm or less. A thickness of the leading-end protective layer 2 of less than 150 μm is not preferable because, due to reduction in strength of the leading-end protective layer 2 itself, resistance to thermal shock is reduced and water resistance is reduced, and, further, resistance to shock acting due to vibration or other factors is reduced. On the other hand, a thickness of the leading-end protective layer 2 of more than 600 μm is not preferable because, due to an increase in heat capacity of the leading-end protective layer 2, power consumption increases when the heater 150 performs heating, and, due to an increase in gas diffusion time, responsiveness of the sensor element 10 is degraded.

The leading-end protective layer 2 preferably has a porosity of 15% to 40%. In this case, adhesion to the element base 1, in particular, to the main surface protective layers 170, which are in contact with most of the leading-end protective layer 2, is suitably secured. A porosity of the leading-end protective layer 2 of less than 15% is not preferable because diffusion resistance increases, and responsiveness of the sensor element 10 is degraded. On the other hand, a porosity of more than 40% is not preferable because adhesion to the element base 1 (specifically, adhesion to the leading end surface 101e and the main surface protective layers 170) is reduced, and the strength of the leading-end protective layer 2 is not secured.

In addition, in the sensor element 10 according to the present embodiment, for the purpose of increasing adhesion of the leading-end protective layer 2 to the leading end surface 101e of the ceramic body 101, the gas inlet 105 is widened in the vicinity of the leading end surface 101e to form a widened portion 105b, and the leading-end protective layer 2 enters the widened portion 105b and is fixed to an inner wall surface thereof, although they are simplified for illustration in FIG. 2. FIGS. 3 to 7 are enlarged views in the vicinity of a portion Q on the one end portion E1 of the sensor element 10 illustrating typical five forms of the configuration.

Specifically, as illustrated in FIGS. 3 to 7, in the sensor element 10 according to the present embodiment, the gas inlet 105 includes a base portion 105a adjacent to the first diffusion control part 110 and the widened portion 105b (a diagonally hatched portion in each figure) that is continuous with the base portion 105a and is wider than the base portion 105a. In FIGS. 3 to 7, a distance from the leading end surface 101e of the ceramic body 101 to an innermost part of the gas inlet 105 (the beginning of the first diffusion control part 110) providing a formation range of the gas inlet 105 in the longitudinal direction of the element is defined as a distance L0, and the widened portion 105b is formed in a range of a distance L1 from the leading end surface 101e within a range of the distance L0.

In addition, in the sensor element 10, the leading-end protective layer 2 (a dotted portion in each figure) has an extension 201a extending from the end surface portion 201 fixed to the leading end surface 101e of the ceramic body 101 into the widened portion 105b of the gas inlet 105.

The above-mentioned thickness of the leading-end protective layer 2 refers to the thickness of a portion of the leading-end protective layer 2 excluding the extension 201a.

Figure 3:
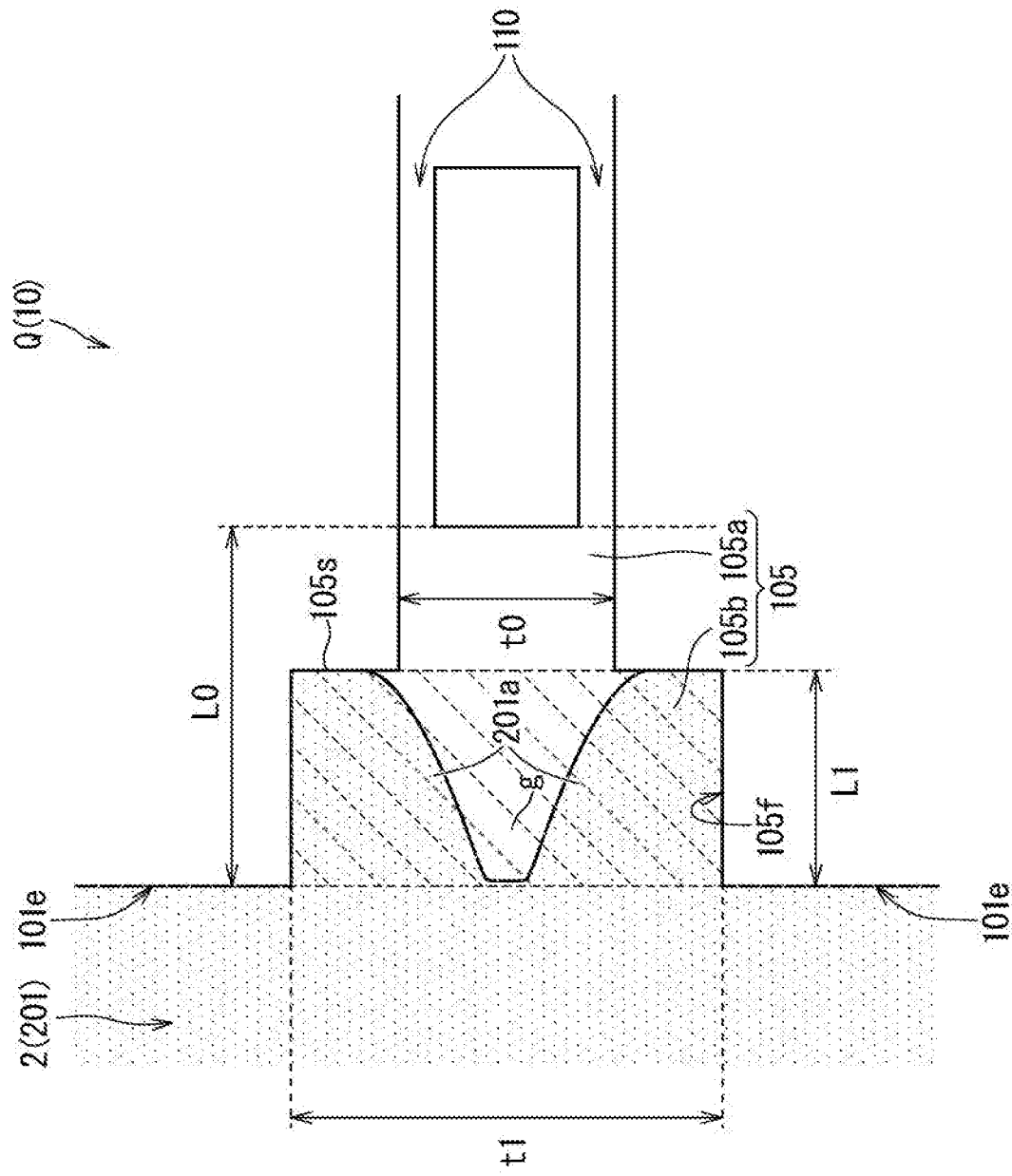
FIG. 3 is an enlarged view in the vicinity of a portion Q on one end portion E1 of the sensor element 10 (corresponding to Example 1)

In a configuration illustrated in FIG. 3, the gas inlet 105 has a step 105s in the middle thereof to form the widened portion 105b. The extension 201a of the leading-end protective layer 2 is fixed to the step 105s and an inner wall surface 105f demarcating the widened portion 105b from four sides in the ceramic body 101. The extension 201a, however, is not buried in the widened portion 105b as a whole, and a groove g is formed between portions of the extension 201a.

Figure 4:
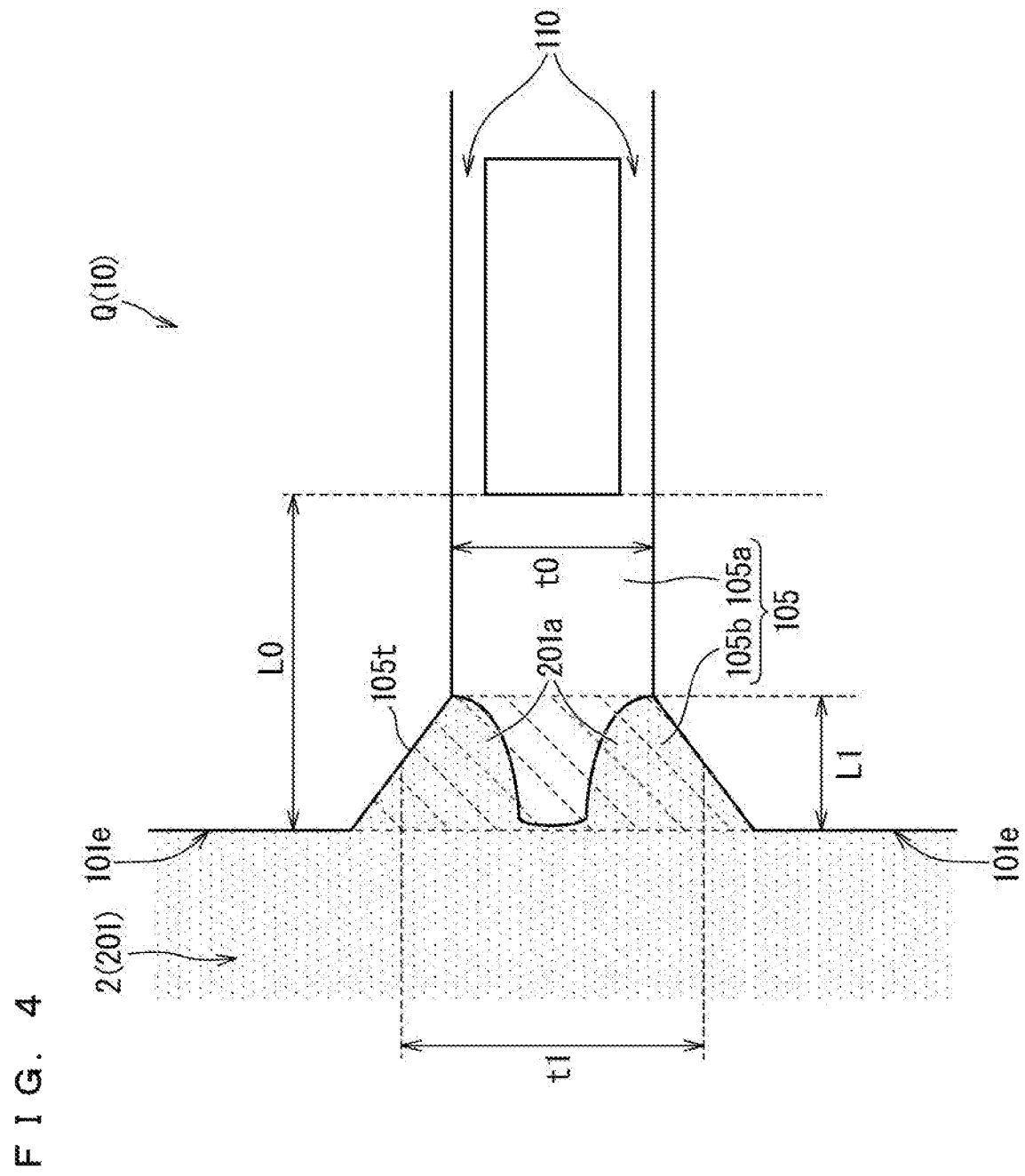
FIG. 4 is an enlarged view in the vicinity of the portion Q on the one end portion E1 of the sensor element 10 (corresponding to Example 2)

In a configuration illustrated in FIG. 4, the widened portion 105b is formed to have, as an inner wall surface, a tapered surface 105t becoming wider from the base portion 105a to the leading end surface 101e. The extension 201a is fixed to the tapered surface 105t, but is not buried in the widened portion 105b as a whole.

Figure 5:
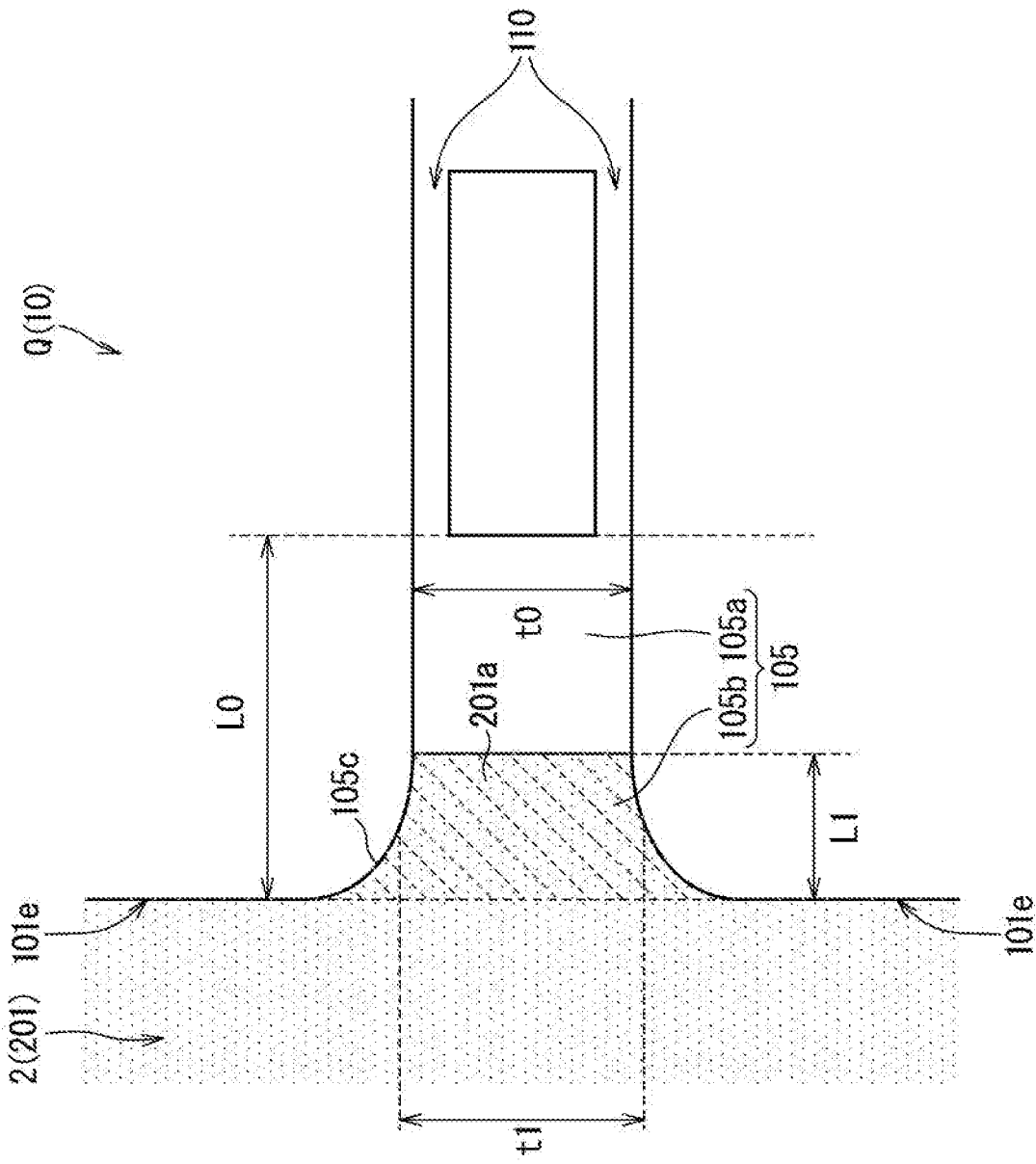
FIG. 5 is an enlarged view in the vicinity of the portion Q on the one end portion E1 of the sensor element 10 (corresponding to Example 3)

In a configuration illustrated in FIG. 5, the widened portion 105b is formed to have, as the inner wall surface, a curved surface 105c curved from the base portion 105a to the leading end surface 101e. The extension 201a is fixed to the curved surface 105c, and is buried in the widened portion 105b as a whole.

Figure 6:
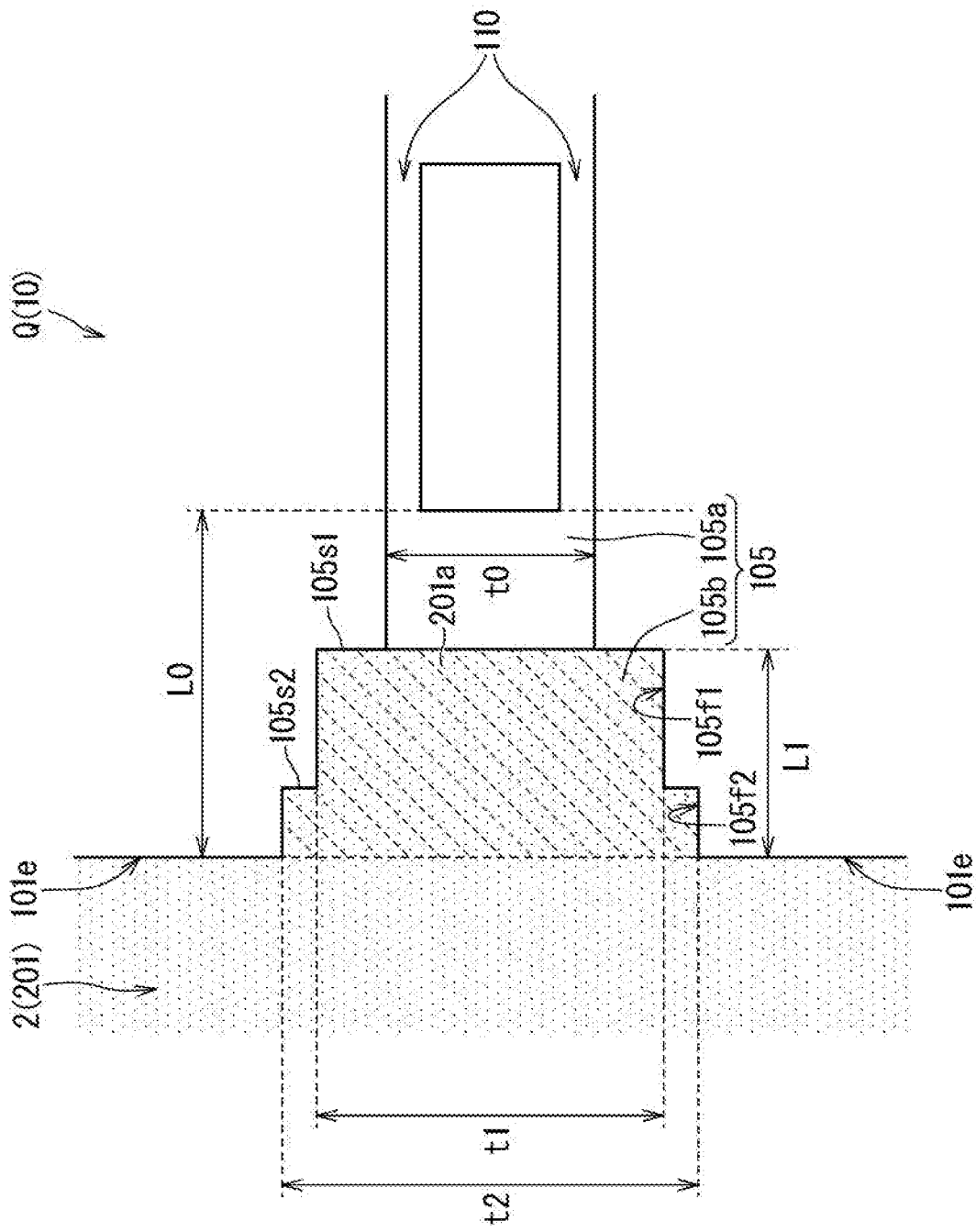
FIG. 6 is an enlarged view in the vicinity of the portion Q on the one end portion E1 of the sensor element 10 (corresponding to Example 4)

In a configuration illustrated in FIG. 6, the gas inlet 105 has two steps 105s1 and 105s2 in the middle thereof to form the widened portion 105b. The extension 201a is fixed to the steps 105s1 and 105s2 and inner wall surfaces 105f1 and 105f2, and is buried in the widened portion 105b as a whole.

Figure 7:
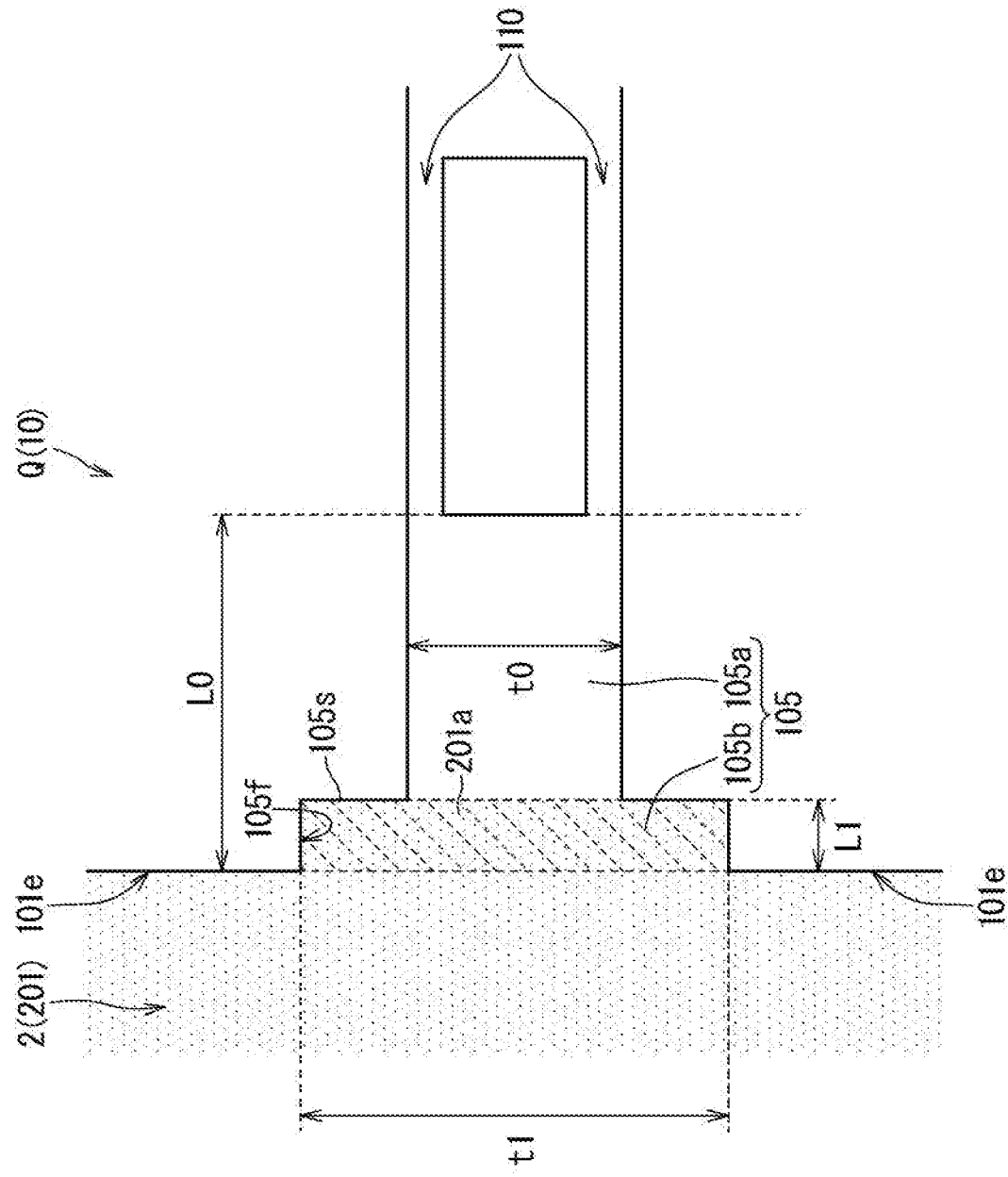
FIG. 7 is an enlarged view in the vicinity of the portion Q on the one end portion E1 of the sensor element 10 (corresponding to Example 5)

A configuration illustrated in FIG. 7 is similar to that illustrated in FIG. 3 in that the step 105s is provided, but the distance L1 is shorter than that in the configuration illustrated in FIG. 3. The extension 201a is fixed to the step 105s and the inner wall surface 105f, and is buried in the widened portion 105b as a whole.

In each of the configurations illustrated in FIGS. 3 to 7, the widened portion 105b naturally has a thickness t1 (thicknesses t1 and t2 in a case of FIG. 6) greater than a thickness (a size in an element thickness direction as a vertical direction in each figure) t0 of the base portion 105a, and has a width w1 greater than a width (a size in a depth direction in each figure) w0 of the base portion 105a, although this is not illustrated.

Combinations of a manner in which the widened portion 105b is formed and a manner in which the extension 201a is formed illustrated in FIGS. 3 to 7 are not fixed. For example, the extension 201a formed in the widened portion 105b illustrated in each of FIGS. 5 to 7 may not bury the widened portion 105b as a whole, and may partially bury the widened portion 105b as illustrated in each of FIGS. 3 and 4. On the other hand, the widened portion 105b as a whole may be buried by the extension 201a in each of FIGS. 3 and 4.

More particularly, the gas inlet 105 is provided to satisfy equations 100 µm≤L0≤500 µm and 0.1≤L1/L0≤0.8. The latter equation indicates that the widened portion 105b is provided to account for 10% or more and 80% or less of a formation range of the gas inlet 105 as a whole.

A distance L0 of less than 100 µm is not preferable because it is likely that formation particles of the leading-end protective layer 2 scattered during formation of the leading-end protective layer 2 (in particular, the extension 201a) enter the first diffusion control part 110 to cause clogging to thereby increase diffusion resistance to more than expected at designing.

On the other hand, a distance L0 of more than 500 µm is not preferable because, to maintain a predetermined element size, it is required to shorten the diffusion control part, and it becomes difficult to achieve desired diffusion resistance, or, to secure the size of the diffusion control part, the element size is elongated.

A ratio L1/L0 of less than 0.1 is not preferable because the effect of securing adhesion of the leading-end protective layer 2 obtained by causing the extension 201a to enter the widened portion 105b is not sufficiently obtained.

On the other hand, a ratio L1/L0 of more than 0.8 to provide the widened portion 105b in a deeper range from the leading end surface 101e is possible, but it is not necessarily easy to cause the extension 201a to reach a deeper location from the leading end surface 101e in relation to the widened portion 105b above provided, and higher cost is required in some cases. Thus, there is not a great need for providing the widened portion 105b in such an extremely deep range.

The widened portion 105b preferably has a volume V of 0.01 mm³ to 0.07 mm³. An equation V=L1·t1·w1 holds true in a case of the configuration illustrated in FIG. 3.

A volume V of less than 0.01 mm³ is not preferable because it is difficult to provide the extension 201a in the widened portion 105b, and a poisoning substance trapping performance of the gas inlet 105 is reduced.

The volume V of the widened portion 105b is preferably 30% to 80% of the volume of the gas inlet 105 as a whole.

The gas inlet 105 includes the widened portion 105b on a leading end side, and the extension 201a of the leading-end protective layer 2 is fixed to the widened portion 105b in the above-mentioned manner, so that delamination and, further, detachment of the leading-end protective layer 2 on the leading end surface of the element base 1 are suitably suppressed even if the sensor element 10 is frequently subjected to thermal shock due to repeated heating up and cooling down during long-term use. That is to say, the sensor element 10 can be said to be less likely to undergo a sensitivity change caused by delamination and, further, detachment of the leading-end protective layer even during long-term use, and thus have high reliability.

As described above, according to the present embodiment, the leading-end protective layer as the porous layer is provided in the element base of the sensor element included in the gas sensor at least around the portion thereof in which the temperature becomes high when the gas sensor is in use, and a portion of the leading-end protective layer is extended into the gas inlet on the one end portion of the element base and is fixed to the inner surface of the gas inlet. The sensor element in which delamination and, further, detachment of the leading-end protective layer on the side of the leading end surface of the element base caused by application of thermal shock is suitably suppressed can thus be achieved.

<Process of Manufacturing Sensor Element>

One example of a process of manufacturing the sensor element 10 having a configuration and features as described above will be described next. FIG. 8 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing. Furthermore, formation (application) of a vanishing material pattern for forming the gas inlet 105 into a desired shape is also performed (step S2a).

The patterns are printed by applying pastes for pattern formation prepared in accordance with the properties required for respective formation targets onto the blank sheets using known screen printing technology. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination.

After the laminated body is obtained as described above, the laminated body is cut out at a plurality of locations to obtain unit bodies eventually becoming the individual element bases 1 (step S5).

The unit bodies as obtained are then each fired at a firing temperature of approximately 1300° C. to 1500° C. (step S6). The element base 1 is thereby manufactured. That is to say, the element base 1 is generated by integrally firing the ceramic body 101 made of the solid electrolyte, the electrodes, and the main surface protective layers 170. Integral firing is performed in this manner, so that the electrodes each have sufficient adhesion strength in the element base 1.

In the process of the firing, the vanishing material provided in a predetermined pattern at a formation target location of the gas inlet 105 disappears, and the gas inlet 105 having the desired shape is formed in the element base 1 as obtained.

Figure 9:
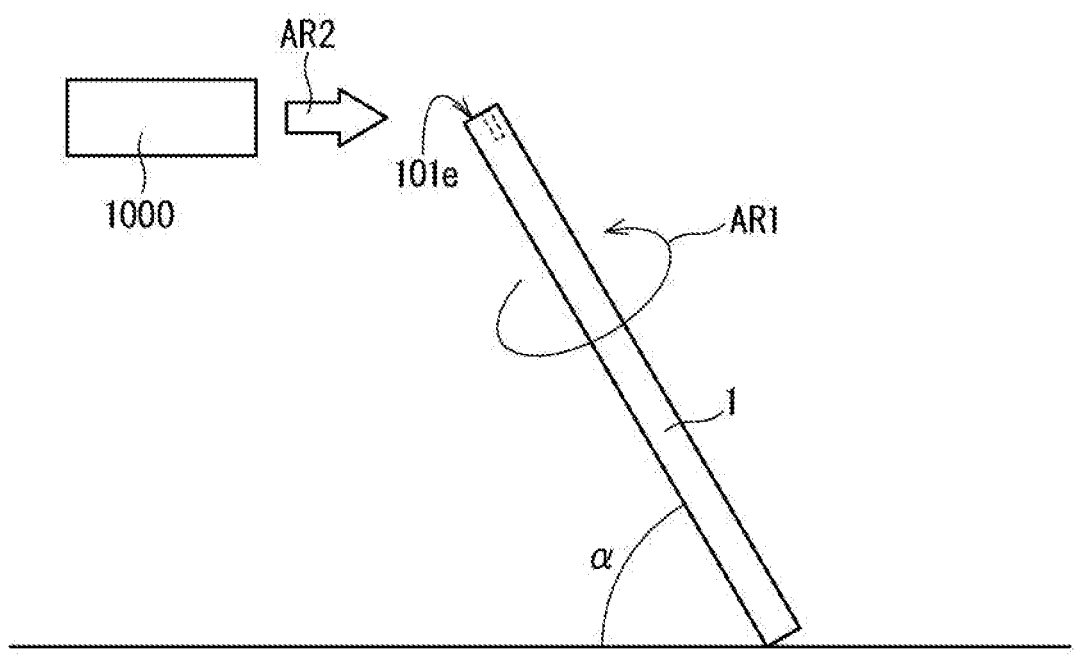
FIG. 9 schematically illustrates formation of a leading-end protective layer 2 by plasma-spraying.

After the element base 1 is manufactured in the above-mentioned manner, the leading-end protective layer 2 is formed with respect to the element base 1. The leading-end protective layer 2 is formed by a method of plasma-spraying. FIG. 9 schematically illustrates formation of the leading-end protective layer 2 by plasma-spraying.

The leading-end protective layer 2 is formed by plasma-spraying slurry containing alumina power as a material for forming the leading-end protective layer 2 at a predetermined formation target location (step S7).

Specifically, as illustrated in FIG. 9, after the element base 1 is inclined to have a predetermined inclination angle α with a side of the leading end surface 101e being up, the element base 1 is continuously rotated about the longitudinal direction of the element as shown by an arrow AR1 while changing the inclination angle α. During the rotation, the slurry is thermal sprayed from a thermal spray gun 1000 towards the side of the leading end surface 101e as shown by an arrow AR2. The slurry thus adheres to the side surfaces of the element base 1, the end surface of the element base 1 (the leading end surface 101e of the ceramic body 101), and, further, the inner wall surface 105f of the widened portion 105b of the gas inlet 105 and the like.

As the alumina power, powder having a maximum particle diameter of 50 μm or less and $D_{50}$ of 23 μm or less is suitable.

The inclination angle α and a rotation speed of the element base 1 are adjusted as appropriate to enable the slurry to adhere to the inner wall surface 105f of the gas inlet 105 so that the leading-end protective layer 2 eventually formed has the extension 201a having a desired form.

The sensor element 10 is completed by formation of the thermal sprayed film.

The sensor element 10 thus obtained is housed in a predetermined housing, and built into the body, which is not illustrated, of the gas sensor 100.

<Modifications>

The above-mentioned embodiments are targeted at a sensor element having three internal chambers, but the sensor element may not necessarily have a three-chamber configuration. That is to say, the configuration in which the gas inlet provided in the end surface of the one end portion of the element base includes the widened portion on the leading end side, and the leading-end protective layer that is the porous layer surrounding the end surface and the predetermined range of the side surfaces of the element base has the extension extending into the widened portion is applicable to a sensor element having one internal chamber or two internal chambers.

Although the leading-end protective layer 2 is provided directly to the element base 1 in the above-mentioned embodiment, the leading-end protective layer 2 may not necessarily be provided directly to the element base 1. FIG. 10 is a schematic block diagram of the gas sensor 100 in a case where the sensor element 10 includes a buffer layer 180 between the element base 1 and the leading-end protective layer 2.

The sensor element 10 illustrated in FIG. 10 includes the buffer layer 180 outside the four side surfaces (on an outer periphery other than the leading end surface 101e) of the element base 1 on the one end portion E1. The leading-end protective layer 2 is provided further outside the buffer layer 180. In FIG. 10, a pump surface-side portion 180a and a heater surface-side portion 180b of the buffer layer 180 are illustrated.

The buffer layer 180 is a porous layer made of alumina, having a relatively large porosity of 30% to 50%, and having a thickness of 20 μm to 50 μm.

In a case where the buffer layer 180 is provided, the leading-end protective layer 2 preferably has a smaller porosity than the buffer layer 180. When the buffer layer 180 has a larger porosity, a so-called anchoring effect acts between the leading-end protective layer 2 and the buffer layer 180 as an underlying layer. Due to the action of the anchoring effect, in the sensor element 10, delamination of the leading-end protective layer 2 from the element base 1 caused by a difference in coefficient of thermal expansion between the leading-end protective layer 2 and the element base 1 is more suitably suppressed when the sensor element 10 is in use.

The buffer layer 180 has a role of preventing poisoning and exposure to water of the sensor element 10 along with the leading-end protective layer 2 and the main surface protective layers 170. In particular, the buffer layer 180 has higher heat insulating properties than the leading-end protective layer 2 and the main surface protective layers 170 when the buffer layer 180 has a larger porosity than the leading-end protective layer 2. This contributes to improvement in water resistance of the sensor element 10.

The buffer layer 180 also has a role as the underlying layer when the leading-end protective layer 2 is formed with respect to the element base 1. From this viewpoint, the buffer layer 180 is only required to be formed, on the side surfaces of the element base 1, at least in a range surrounded by the leading-end protective layer 2.

Manufacture of the sensor element 10 including the buffer layer 180 as illustrated in FIG. 10 is achieved by further performing, with respect to an individual element body obtained by the procedures shown in FIG. 8, a process of forming (applying and drying) a pattern eventually becoming the buffer layer 180, and then firing. Formation of the pattern is performed using a paste prepared in advance so that the buffer layer 180 as desired is eventually formed. That is to say, the element base 1 of the sensor element 10 illustrated in FIG. 10 is generated by integrally firing the ceramic body 101 made of the solid electrolyte, the electrodes, the main surface protective layers 170, and the buffer layer 180.

EXAMPLES

The five types of sensor elements 10 (sequentially defined as Examples 1 to 5) having different forms of the gas inlet 105 and different forms of the extension 201a of the leading-end protective layer 2 illustrated in FIGS. 3 to 7 were manufactured. The sensor elements 10 were set to have formation ratios of the widened portion 105b to the gas inlet 105 as a whole of 60%, 70%, 80%, 30%, and 10% respectively. In each of Examples 1 and 2, the widened portion 105b was partially not buried by the extension 201a of the leading-end protective layer 2 while the extension 201a was fixed to the inner wall surface (specifically, to the inner wall surface 105f and the step 105s or to the tapered surface 105t) demarcating the widened portion 105b as illustrated in FIGS. 3 and 4. In each of Examples 3 to 5, the widened portion 105b as a whole was buried as illustrated in FIGS. 5 to 7. In each of Examples, the distance L0 was set to 300 μm, and the volume V of the widened portion 105b was set to 0.02 mm$^3$.

As comparative examples, a sensor element (Comparative Example 1) having the gas inlet 105 having a constant thickness without including the widened portion 105b, and including the leading-end protective layer 2 having no extension extending into the gas inlet 105, and, a sensor element (Comparative Example 2) having a formation ratio of the widened portion 105b to the gas inlet 105 as a whole of 5%, were manufactured. These comparative examples were manufactured under the same condition as Examples 1 to 5 except for formation of the widened portion 105b. In Comparative Example 2, the widened portion 105b and the extension 201a of the leading-end protective layer 2 were provided in a similar manner to those in FIG. 7.

A heating/cooling cycle test in which heating up and down and an atmosphere change were cyclically repeated and measurement of a pump current Ip0 in the main pump cell P1 of each sensor element before and after the test were conducted on each of the sensor elements as obtained to evaluate resistance to thermal shock.

In the heating/cooling cycle test, a temperature profile of "keeping at 950° C. for five minutes" and then "keeping at 300° C. for five minutes" was set as one cycle of heating up and down, and it was repeated 600 times. Test gas atmosphere was exhaust gas atmosphere with λ=1.1 at 950° C., and was ambient atmosphere at 300° C.

The pump current Ip0 was measured under model gas atmosphere including oxygen having an O$_2$ concentration of 20.5 mol % and nitrogen as the remainder.

A ratio (pump current change ratio) of a difference value of the pump current Ip0 to a value of the pump current Ip0 before the test was calculated, and whether a prominent sensitivity change occurred before and after the heating/cooling cycle test was determined using the magnitude of the ratio (Determination 1).

An Mg water dropping test and measurement of the pump current Ip0 in the main pump cell P1 of each sensor element before and after the test were also conducted on each of the sensor elements to evaluate resistance to poisoning.

The Mg water dropping test was conducted by dropping Mg water (composition: Mg(NO$_3$)$_2$.6H$_2$O: 0.61 g/L; CaCl$_2$.6H$_2$O: 0.19 g/L; NaHCO$_3$: 0.18 g/L; Na$_2$SO$_4$: 0.17 g/L; and KNO$_3$: 0.05 g/L) having a concentration of 0.0025 mol/L of 50 μL onto the one end portion E1 of the sensor element on which the leading-end protective layer was provided, and then placing the sensor element under atmosphere at 100° C. for five minutes.

The pump current Ip0 was measured under the same condition as that in the above-mentioned measurement before and after the heating/cooling cycle test. Whether a prominent sensitivity change occurred before and after the Mg water dropping test was determined using the magnitude of the pump current change ratio (Determination 2).

The ratio of the widened portion 105b and the results of Determinations 1 and 2 for each sensor element are shown as a list.

TABLE 1

| LEVEL | RATIO OF WIDENED PORTION [%] | DETERMINATION 1 [%] | DETERMINATION 2 [%] |
|---|---|---|---|
| EXAMPLE 1 | 60 | 0.5 | −2.0 |
| EXAMPLE 2 | 70 | 1.0 | −1.0 |
| EXAMPLE 3 | 80 | 1.0 | −1.0 |
| EXAMPLE 4 | 30 | 2.0 | −3.0 |
| EXAMPLE 5 | 10 | 3.0 | −4.0 |
| COMPARATIVE EXAMPLE 1 | 0 | 8.0 | −12.0 |
| COMPARATIVE EXAMPLE 2 | 5 | 6.0 | −8.0 |

In Determinations 1 and 2, when the pump current change ratio is ±5% or less, it is determined that the prominent sensitivity change does not occur in the sensor element before and after the heating/cooling cycle test or the Mg water dropping test. When the pump current change ratio exceeds ±5%, it is determined that the prominent sensitivity change occurs in the sensor element before and after the heating/cooling cycle test or the Mg water dropping test.

As shown in Table 1, the pump current change ratio is ±5% or less in each of Determinations 1 and 2 in the sensor elements in Examples 1 to 5, whereas the pump current change ratio exceeds ±5% in each of Determinations 1 and 2 in the sensor elements in Comparative Examples 1 and 2.

The results shown in Table 1 indicate that, as in the above-mentioned embodiment, the configuration in which the gas inlet of the sensor element includes the widened portion on the leading end side and the leading-end protective layer is extended into the widened portion to fix the extension to the inner wall surface of the widened portion is effective in suppressing delamination and, further, detachment of the leading-end protective layer from the leading end surface caused by thermal shock.

Even when the configuration is adopted, resistance to poisoning is sufficiently secured, or rather, increases compared with a configuration in which the widened portion 105b and the extension 201a of the leading-end protective layer 2 are not included.

While the invention has been shown and described in detail, the foregoing description is in all aspects illustrative and not restrictive. It is therefore understood that numerous modifications and variations can be devised without departing from the scope of the invention.

What is claimed is:

1. A sensor element included in a gas sensor detecting a predetermined gas component in a measurement gas, said sensor element comprising:
an element base including:
   an elongated planar ceramic body made of an oxygen-ion conductive solid electrolyte, and having a gas inlet at one end portion thereof;
   at least one internal chamber and at least one diffusion control part located inside said ceramic body, and communicating with said gas inlet under predetermined diffusion resistance, said gas inlet extending from a leading end surface of said ceramic body to an innermost part of said gas inlet at said at least one diffusion control part;
   at least one electrochemical pump cell including an outer pump electrode located on an outer surface of said ceramic body, an inner pump electrode located to face said at least one internal chamber, and a solid electrolyte located between said outer pump electrode and said inner pump electrode, said at least one electrochemical pump cell pumping in and out oxygen between said at least one internal chamber and an outside; and
   a heater buried in a predetermined range on a side of said one end portion of said ceramic body, and
a leading-end protective layer being porous, and covering said leading end surface and four side surfaces in a predetermined range of said element base on said one end portion, wherein
said gas inlet includes a base portion of a fixed thickness at the innermost part of said gas inlet and a widened portion continuous with said base portion, said widened portion provided on a leading end side of said ceramic body closer than said base portion and having a thickness greater than a thickness of said base portion, and
said leading-end protective layer has an extension extending into said widened portion, and fixed to an inner wall surface of said widened portion.

2. The sensor element according to claim 1, wherein

100 μm≤$L0$≤500 μm, and 0.1≤$L1/L0$≤0.8, where $L0$ is a distance from the leading end surface of said ceramic body to the innermost part of said gas inlet, and $L1$ is a formation range of said widened portion from said leading end surface in a longitudinal direction of said sensor element.

3. The sensor element according to claim 2, wherein said widened portion as a whole is buried by said extension.

4. The sensor element according to claim 3, further comprising
a buffer layer being porous, having a larger porosity than said leading-end protective layer, and located outside said four side surfaces of said element base, wherein said leading-end protective layer is located further outside said buffer layer.

5. The sensor element according to claim 2, wherein said widened portion has a volume of 0.01 mm3 to 0.07 mm3.

6. The sensor element according to claim 5, further comprising
a buffer layer being porous, having a larger porosity than said leading-end protective layer, and located outside said four side surfaces of said element base, wherein said leading-end protective layer is located further outside said buffer layer.

7. The sensor element according to claim 2, further comprising
a buffer layer being porous, having a larger porosity than said leading-end protective layer, and located outside said four side surfaces of said element base, wherein said leading-end protective layer is located further outside said buffer layer.

8. The sensor element according to claim 1, wherein said widened portion as a whole is buried by said extension.

9. The sensor element according to claim 8, wherein said widened portion has a volume of 0.01 mm3 to 0.07 mm3.

10. The sensor element according to claim 9, further comprising
a buffer layer being porous, having a larger porosity than said leading-end protective layer, and located outside said four side surfaces of said element base, wherein said leading-end protective layer is located further outside said buffer layer.

11. The sensor element according to claim 8, further comprising
a buffer layer being porous, having a larger porosity than said leading-end protective layer, and located outside said four side surfaces of said element base, wherein said leading-end protective layer is located further outside said buffer layer.

12. The sensor element according to claim 1, wherein said widened portion has a volume of 0.01 $mm^3$ to 0.07 $mm^3$.

13. The sensor element according to claim 12, further comprising
a buffer layer being porous, having a larger porosity than said leading-end protective layer, and located outside said four side surfaces of said element base, wherein said leading-end protective layer is located further outside said buffer layer.

14. The sensor element according to claim 1, further comprising
a buffer layer being porous, having a larger porosity than said leading-end protective layer, and located outside said four side surfaces of said element base, wherein said leading-end protective layer is located further outside said buffer layer.

* * * * *